Aug. 4, 1970
W. LABUDE ETAL
3,522,542
PUSHBUTTON CHANNEL SELECTING AND VOLTAGE
DIVIDER PRESETTING UNIT
Filed Sept. 30, 1965
12 Sheets-Sheet 11
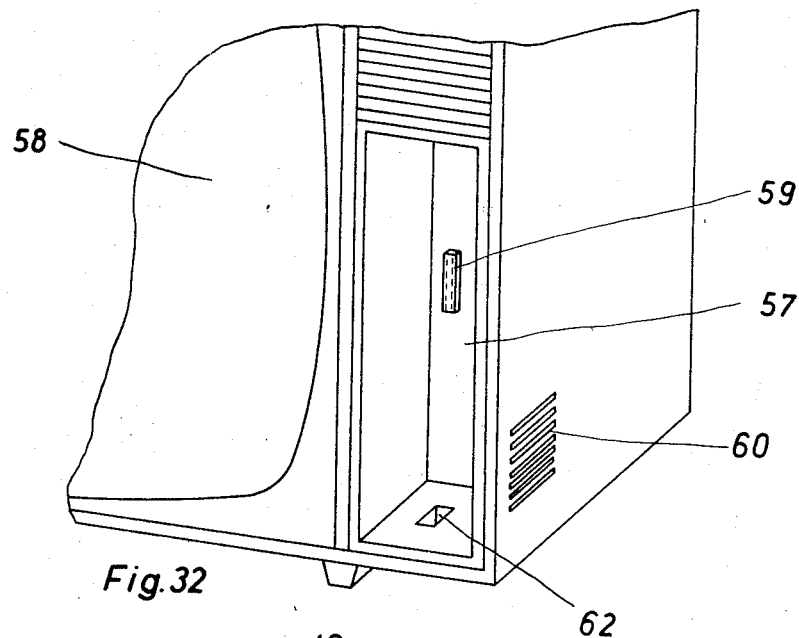
Fig. 32
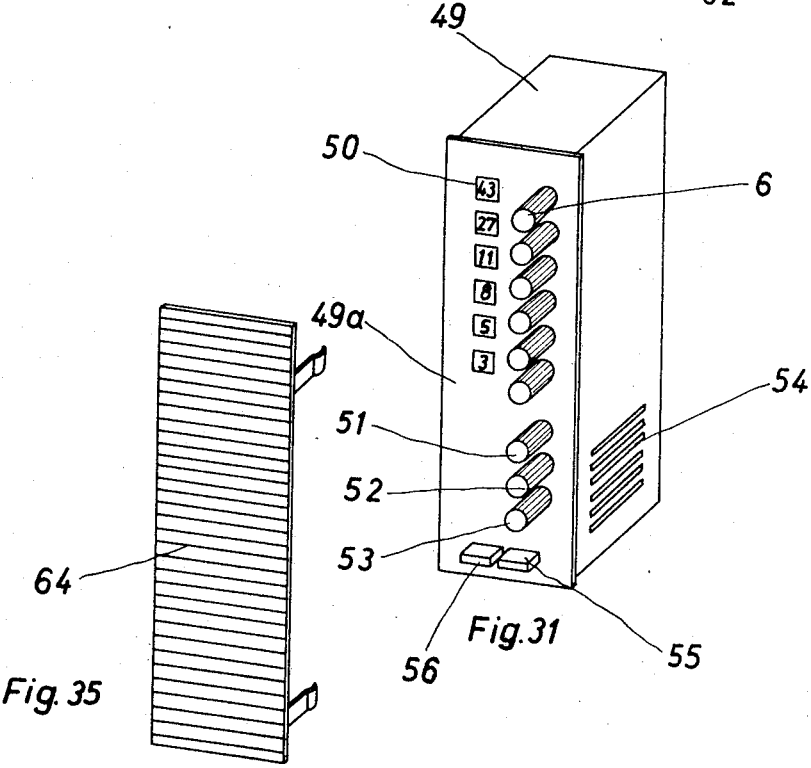
Fig. 31
Fig. 35

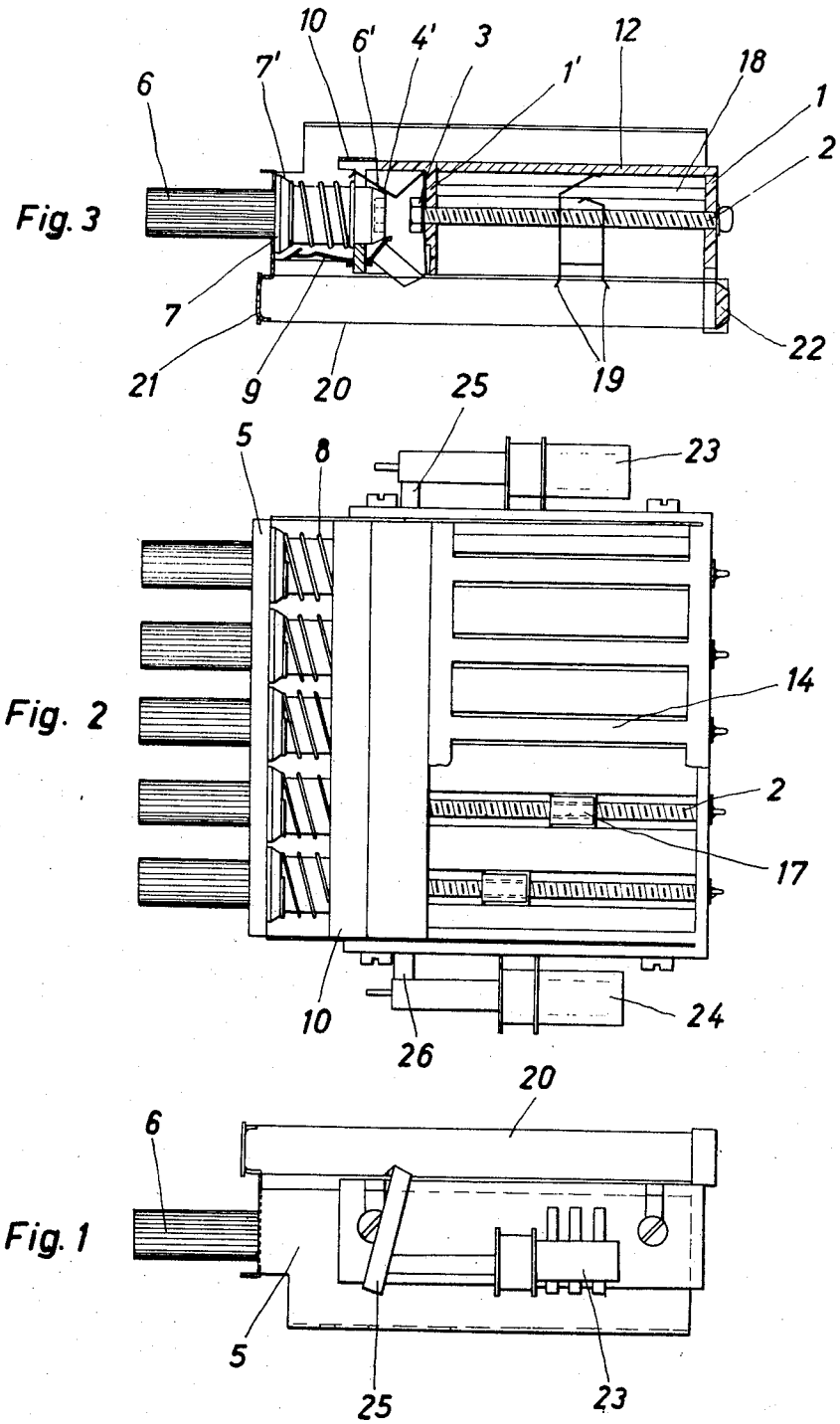

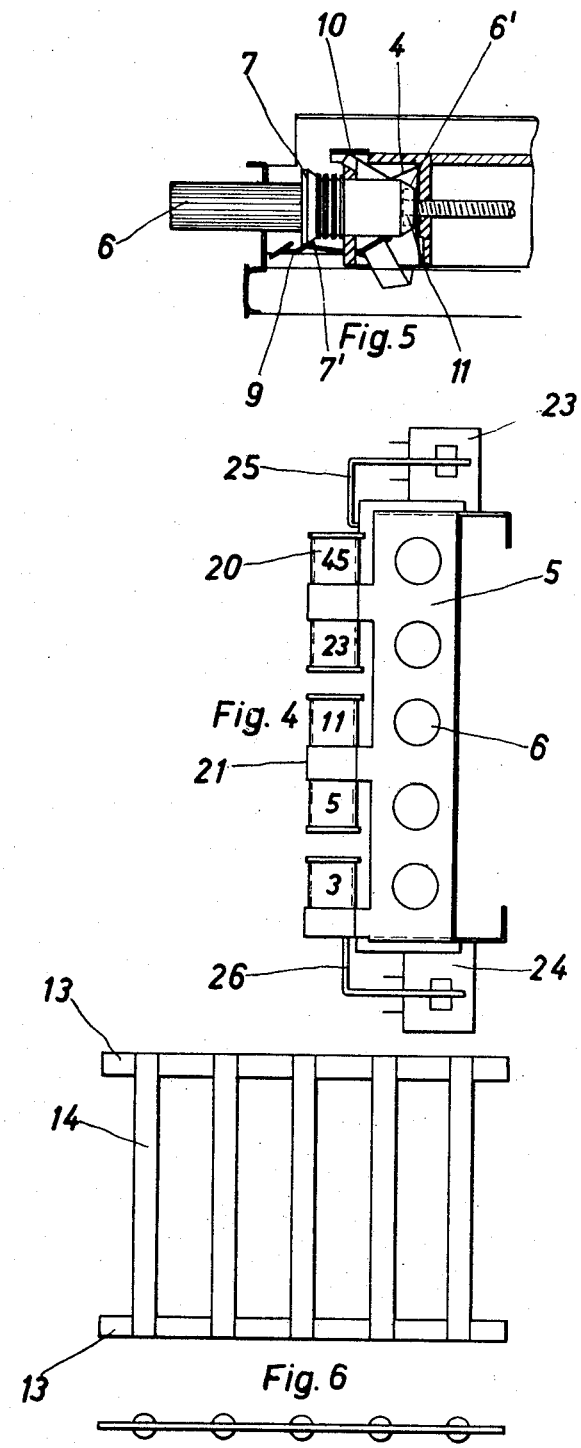

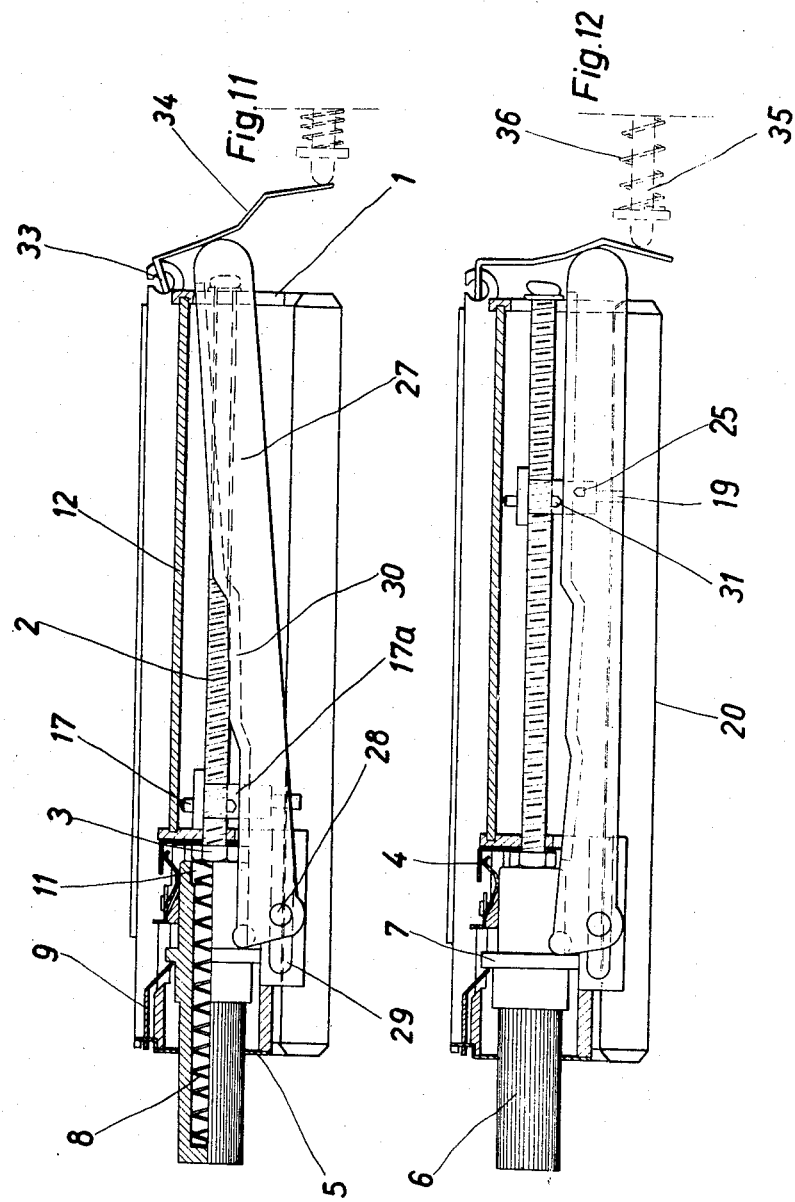

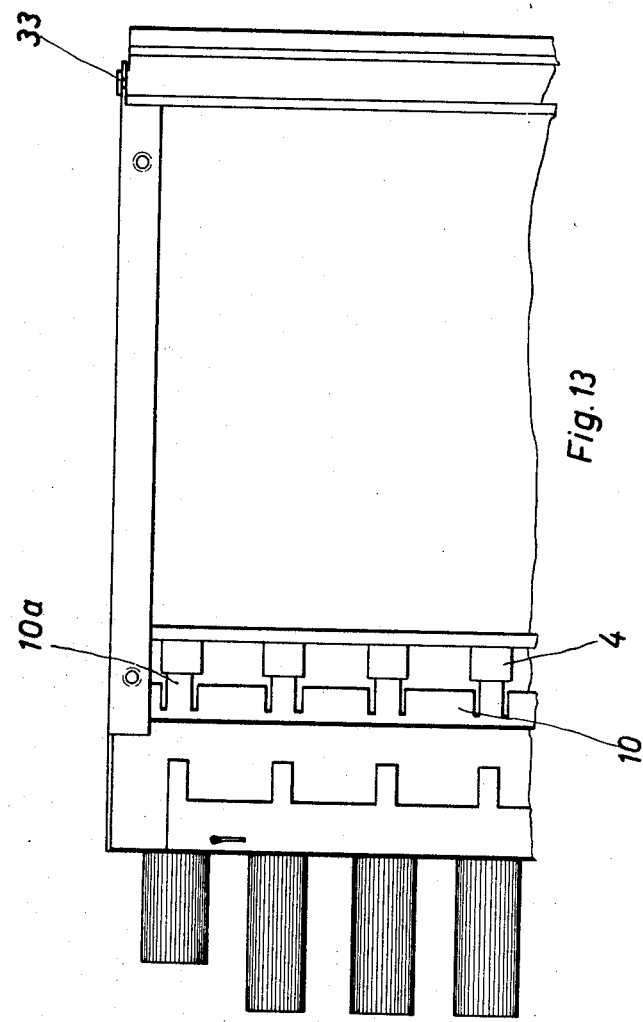

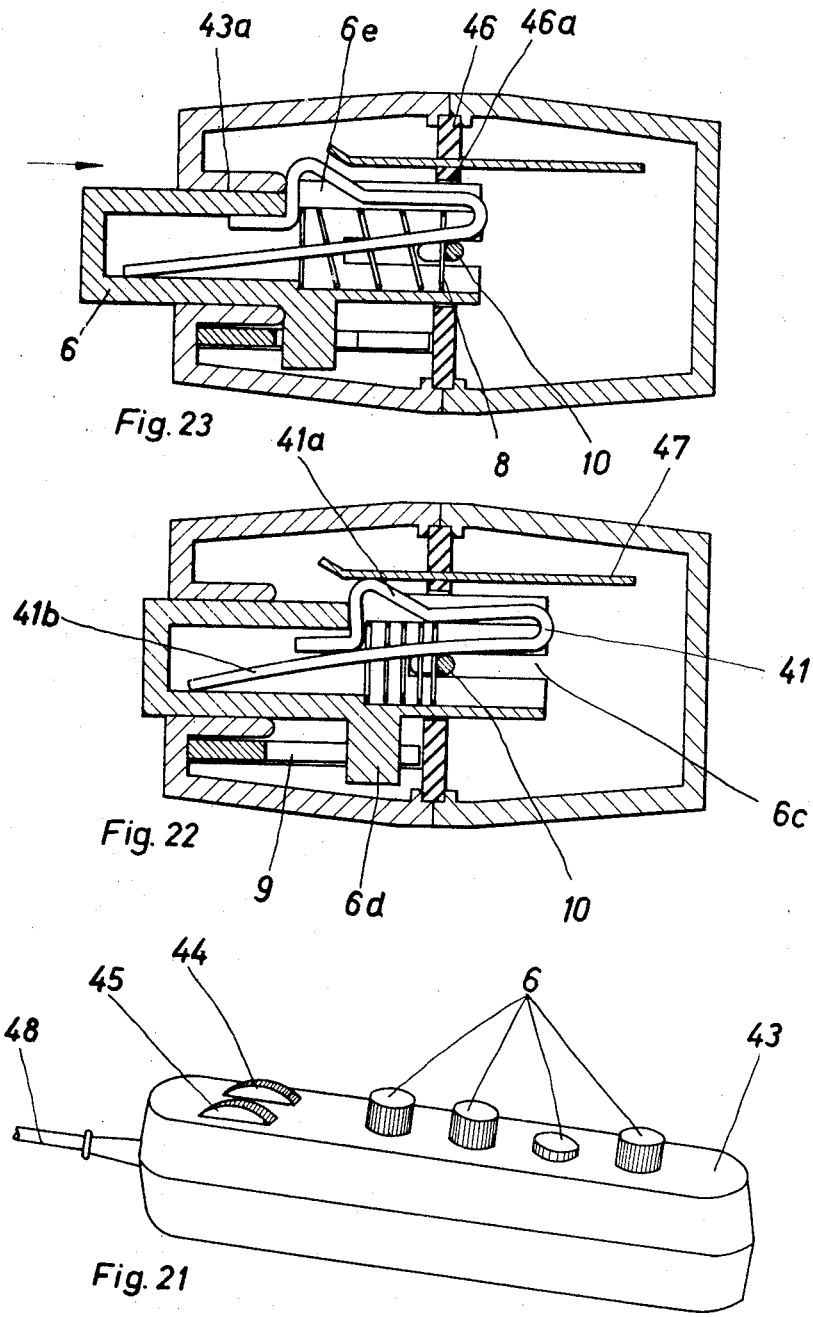

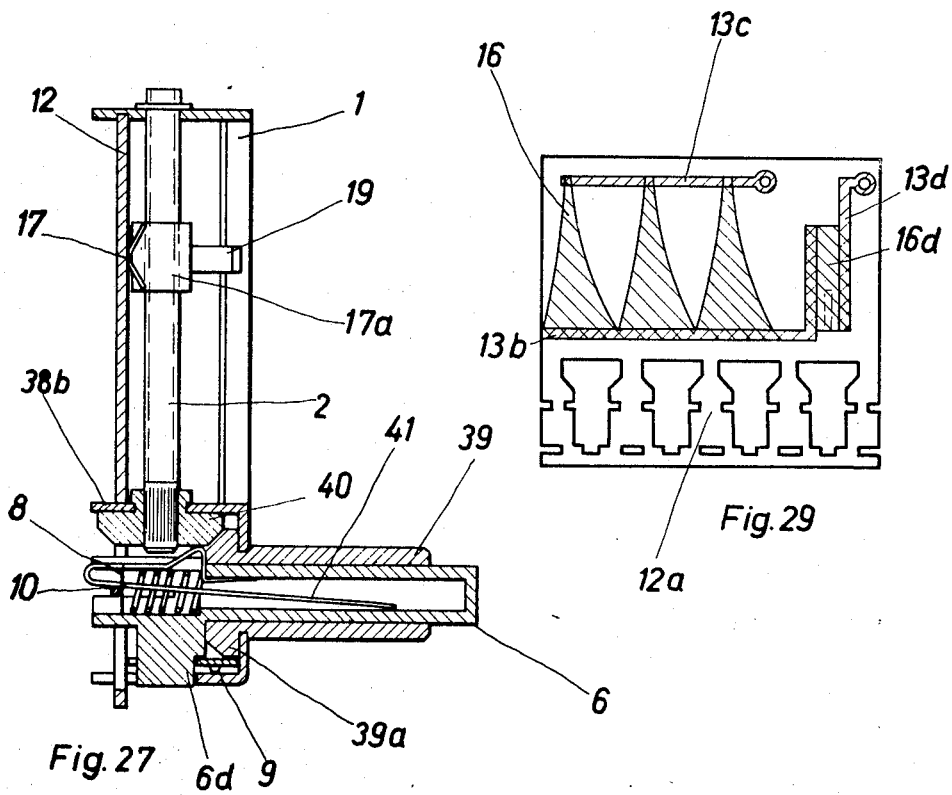
Fig. 27
Fig. 29
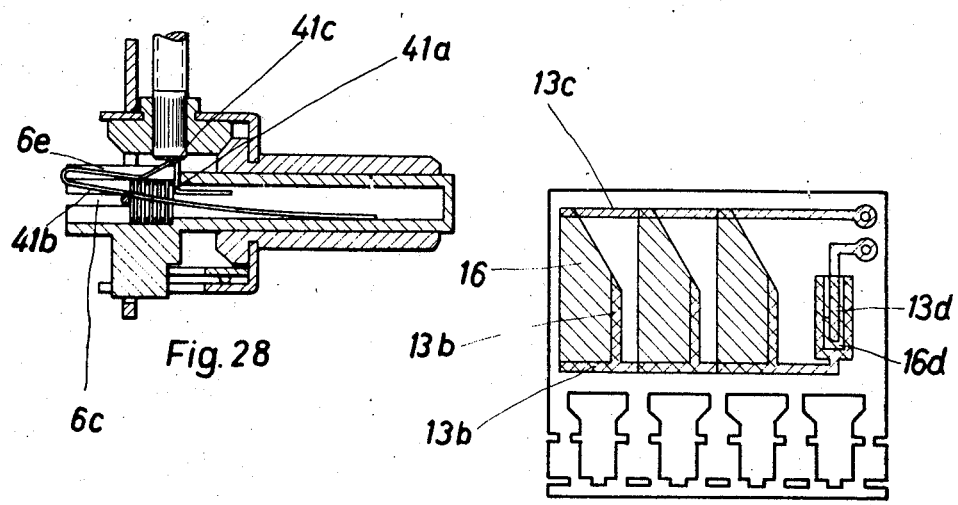
Fig. 28
Fig. 30

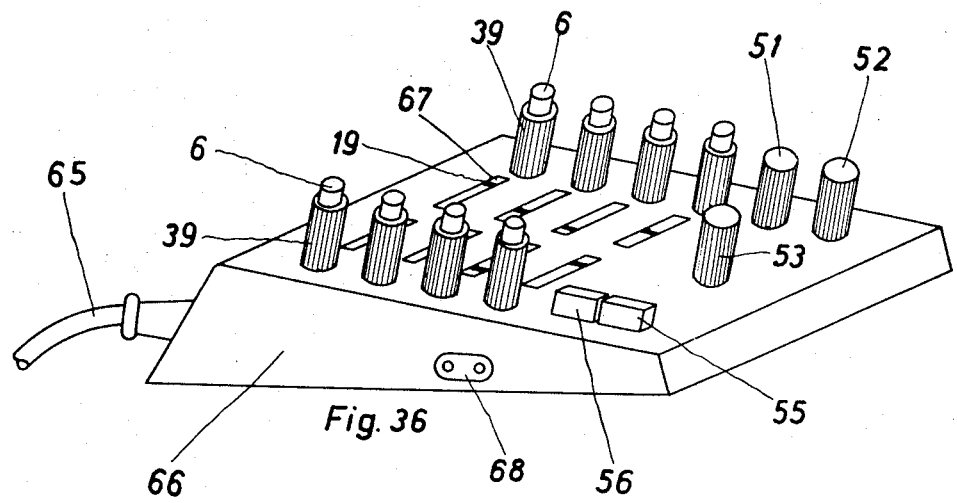
Fig. 36
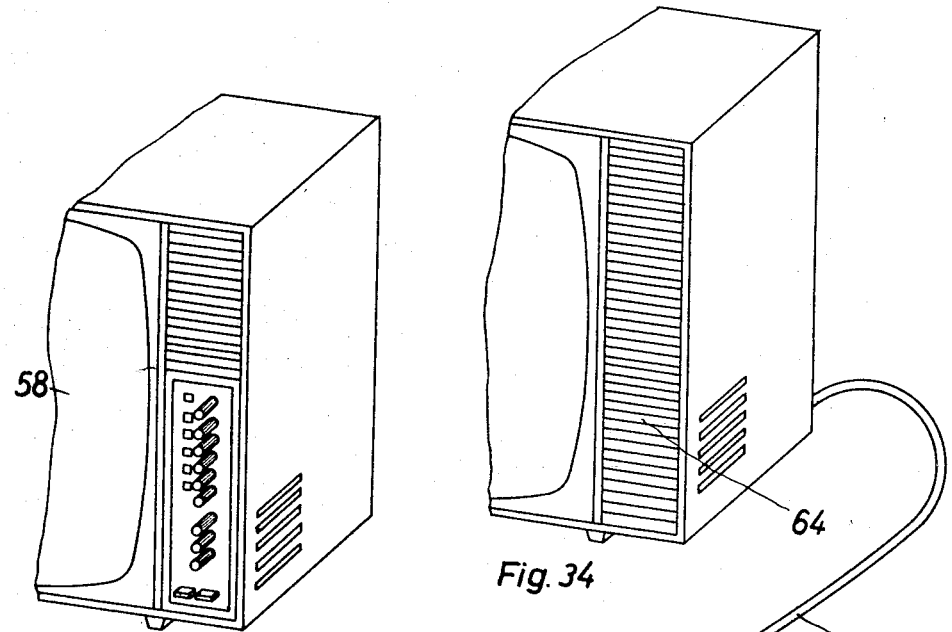
Fig. 33
Fig. 34

United States Patent Office 3,522,542
Patented Aug. 4, 1970

3,522,542
PUSHBUTTON CHANNEL SELECTING AND VOLTAGE DIVIDER PRESETTING UNIT
Wolfgang Labude, Bad Neustadt (Saale), and Karlheinz Bauer, Muhlbach, Germany, assignors to Preh Elektrofeinmechanische Werke, Jakob Preh Nachf., Bad Neustadt (Saale), Germany, a corporation of Germany
Filed Sept. 30, 1965, Ser. No. 491,708
Claims priority, application Germany, Oct. 17, 1964, P 35,298
Int. Cl. H03j 5/00, 5/12
U.S. Cl. 325—458   20 Claims

ABSTRACT OF THE DISCLOSURE

Pushbutton channel selecting an dvoltage divider presetting device in which a plurality of elongated resistors and electrical conductors are electrically insulatedly placed on a plate, the conductors are electrically conductingly connected with the ends of said resistors and adapted to be connected to a source of electric current, spring biased pushbuttons are slidably mounted for back and forth movement in a frame structure supporting said plate, a plurality of screw threaded spindles, one each for each of said resistors, extend close to and parallel with such resistor, a wiper contact on each one of said screw threaded spindles resiliently engages the appertaining one of said resistors, switching means are inserted between each one of said wiper contacts and a common conductor adapted to be connected to a voltage responsive reactance device (such as a variable capacitance diode), means on said pushbuttons are adapted to switch on the switching means of the appertaining wiper contact to the said conductor upon pushing in such pushbutton, means associated with each of said pushbuttons is adapted to rotate said spindles, to thereby move the appertaining one of said wiper contacts along the appertaining one of said resistors and to thereby preset such resistor to a desired voltage division.

---

This invention relates to an adjusting unit, comprising variable resistances or voltage dividers, by means of which a plurality of storable and selectable working voltages for regulating and tuning elements, more particularly capacitance diodes (varactors) can be readily and reliably adjusted. The varactor is a semiconductor whose barrier layer capacitance is a very exact function of the applied voltage. The varactor therefore affords a very favourable possibility of tuning oscillatory circuits by voltage variations, which can be produced in a very simple manner by means of variable ohmic resistances connected as voltage dividers. For simplifying the operation, it is desirable, particularly in radio and television apparatus, to effect tuning, that is to say, the selection of the transmitter, discontinuously, by means of circuits tuned to the respective channel frequencies, which circuits, after once tuning or channel storage, can be switched on and off at any time selectively by means of a knob.

The present invention is based on the problem of producing an adjusting unit which is simple to operate, has a high working reliability and repetition accuracy, and is of such simple construction that it can be made at low expenditure automatically in individual components groups.

According to the invention, it is proposed to assemble a series of variable resistances, corresponding to the number of channel stores, in a component, and to provide the latter with mutually disengaging operating elements, whereby the sliding contacts of the variable resistances can be connected selectively to a contact bar and are adjustable for varying the tapped voltage.

By the integration of the voltage dividers and channel selecting device, there is obtained not only a very stable and reliable construction, but also two-fold utilisation of the operating elements and hence a very simple storage and selection of the desired channels.

Compared with a known arrangement in which channel preselection is effected by the storage of definite selectable positions of the wiper on a single voltage divider, the arrangement according to the invention has the advantage that on switching over from one channel store to another, no mechanical variations of the preselected wiper positions are necessary, and that therefore the problem of repetition accuracy does not arise at all. In addition, in the proposal according to the invention, the advantages concerning remote operation, provided by electronic tuning by means of the varactor, are fully utilisable, since the preselected and continuously available tuning voltages can be switched in selectively from any desired place.

According to a first embodiment, the unit comprising a number of variable resistances is constructed in such a manner that the individual resistances are formed as straight, parallel rod or strip resistances, wiped longitudinally by their wipers and connected together by common initial and end rails, arranged at right angles to them. This unit therefore represents a ladder-like structure, the side rails of which correspond to the initial and end rails, and the rungs to the resistances. A simple and expense saving construciton of this system consists in applying to a rectangular insulating plate in known manner resistance layers, and to the opposite marginal strips thereof layers of good-conducting material, and in stamping rectangular openings out of the plate, thereby forming rung-like strip resistances connected together by the good-conducting layer.

Another embodiment of this resistance unit consists in making a ladder-like insulator part by stamping, pressing, spraying, injection moulding, or other known process, and providing its rails with good-conducting layers and its rungs with resistance layers. A stamped insulator part may in such a case also be made of an insulating plate backed by metal foil, on which plate the conducting rungs are provided by the known printed circuit technique. The resistance unit may also be formed by applying between two parallel metal strips, strip-like or bar-like resistances at right angles to said metal strips, the resistances being formed by the application of resistance layer or by winding resistance wires on insulating bodies. Finally, the resistance rungs made of plastics material provided with conducting pigments may be pressed or injection moulded on the metal rails or fixed thereto in some other known manner. It is possible to use as resistance layers, in known manner, hardenable synthetic resin lacquer mixtures, provided with conducting pigments, or metal films or metal oxide films.

According to a further embodiment of the invention, the resistance unit is formed by applying to a rectangular insulating plate the initial and end rails as good-conducting, parallel layer strips, and applying between the later homogeneous resistance surfaces delimited from each other. The conducting layers and resistance layers may be sprayed on with stencils in known manner, printed, painted or rolled on according to known processes, or applied by other known processes.

In most cases of use, it will be necessary—as also in the case of the varactor—for approximate linearisation of the tuning curve, to provide the voltage dividers with a nonlinear regulating curve. This may be done in various ways. Thus, in the case of the ladder-like resistance unit, resistance layers having different surface resistances may be applied to the rungs in known manner in partial areas following each other in the direction of movement of the wiper, whereby almost any desired form of curve can be made. A nonlinear form of curve may also be produced by the stamped-out openings of the homogeneously coated insulating plate having a nonrectangular form, and the resistance strips therefore having a different width along the wiper track.

In the case of a resistance unit in which the individual resistances are produced by spraying or printing on a noninterrupted insulating plate, nonlinear forms of curve may be produced by varying the width of the homogeneous resistance layer along the wiper track. This embodiment has the advantage that the form of curve is dependent only on the geometrical boundary of the layer surface and its homogentity. Both the boundary lines of the layer surface and its uniformity may be kept within narrow limits, so that there is only a slight scatter of the shape of the curve from the desired shape, and the use of printed scales is possible for indicating the voltage or channel adjusted in each case.

In a further embodiment of the invention, for the production of nonlinear forms of curve, the construction of so-called surface voltage dividers is proposed, in which by suitable shaping of the input and lead-off electrodes, as well as of the resistance surfaces, the potential distribution produced in the resistance layer is such that the voltage divider curve, resulting during the exploration of the layer surfaces along the rectilinear wiper path, corresponds to a definite function.

For the production of exponential or approximately exponential voltage curves, which are principally necessary for tuning with varactors, the layer surfaces are made rectangular in known manner and the lead-off electrode is applied to a lateral edge parallel to the wiper path over the entire length or a portion thereof. For adapting the form of curve to definite conditions given by the characteristic of the regulating or tuning elements to be fed, the layer surfaces and/or their lead-off electrodes may possess boundary lines consisting of portions parallel to the wiper track or inclined to said track and/or curved.

Such surface voltage dividers are also provided with a homogeneous resistance layer, so that the curve truth depends solely on the geometrical dimensions of the layer surfaces and their electrodes, as well as on the uniformity of the layer application.

A further advantage of the homogeneously coated voltage dividers is that any variations due to temperature fluctuations, humidity or ageing, occur uniformly in the entire layer surface, and therefore, despite variation in the total resistance, the adjusted voltage divider proportion is affected either not at all or only very slightly.

For adjusting units in which the voltage is not to be regulated down to zero value and for which therefore a basic resistance must be provided in series with the parallel-connected voltage divider resistances, it is proposed in a further embodiment of the invention to apply this basic resistance to the insulating plate of the resistance component as layer resistance, preferably of the same layer as that of the voltage divider elements. This arrangement not only results in a reduction of the production costs, but it also increases the working constancy of the adjusting unit, since varying influences act in the same way on the basic resistance as on the voltage dividers themselves and, due to the proportionality of this variation, the voltage divider ratio is maintained.

In applications in which the minimum tappable partial voltage is to be only avery small fraction of the total voltage, the value of the basic resistance is naturally also very small in proportion to the resistance of the parallel-connected voltage dividers. In order to attain the very low value of the basic resistance with the layer of the voltage divider elements, it is proposed, in a further embodiment, to form its layer surface with a relatively large length/breadth ratio, and to attach its connections to the long sides thereof. This embodiment also permits very easy and exact equalisation or trimming of the voltage regulating range. The value of such a resistance, which is indirectly proportional to the length of the layer surface, may be increased by removal of a partial region of the layer. Since the length of the layer is relatively large, the partial pieces to be removed for the purpose of trimming are so long that fine trimming is possible, even in the case of small resistance variations.

To achieve exact tuning, the voltage dividers must be finely adjustable. For moving the wipers over the resistance elements, therefore, screw-threaded spindles arranged parallel thereto will be used in known manner, the wiping contacts sliding on the layer surfaces being very finely adjustable by rotation of said spindles. The screw-threaded spindles may be rotatably mounted in a rectangular plastics housing on which the resistance component is mounted in the manner of a cover. It is possible to use as wipers contacts formed from spring strip or wire, which by means of one or more wiper tongues bear on the resistance element with suitable prestressing, and are conductively connected to the screw-threaded spindle. Voltage takeoff may also be effected in known manner by means of a carbon contact or noble metal contact inserted in the wiper spring. Furthermore, in known manner, the wipers may be guided in the frame of the unit by means of projections, lugs or the like, formed integral with them, or by means of insulator spring carriers, in such a manner that they are axially slidable, but not rotatable.

For switching in a certain channel store, that is to say for channel selection, its screw-threaded spindle, by actuation of the corresponding operating element, is connected to the contact rail, which is common to all channel stores and through which the tapped voltage is fed to the varactor. For this purpose, according to a first proposal, contact springs may be mounted on the screw-threaded spindles, which springs, on actuation of the operating element, are pressed against the contact rail, and when the operating element is released, return to the resting position by their own spring power. According to a second proposal, the screw-threaded spindle of the particular channel store can be connected to the contact rail by a U-shaped spring, which when the operating element is actuated is inserted between the contact rail and the end of the screw-threaded spindle. In both proposals, the operating elements are push keys which are provided with suitable catch projections and which in known manner, after their actuation, catch in a common catch member, are released by operation of another key and are returned to the resting position by the action of a return spring.

For channel tuning, that is to say for varying the wiper setting of a channel store, according to an embodiment of the invention, the push key, constructed as rotary knob, serves at the same time for channel selection. In this embodiment, the direction of displacement of the push key coincides with the axial direction of the screw-threaded spindle. The axially displaceable rotary key may here be either continuously coupled to the screw-threaded spindle, that is to say also in the resting position, or may be coupled up on the displacement movement of the rotary key for operating channel selection, or may be adapted to be coupled to the screw-threaded spindle only on displacement of the rotary key beyond the catch position, by means of a so-called overstroke. The last two embodiments have the advantage that unintentional rotation of the screw-threaded spindle and hence variation of the channel tuning is not possible in the resting position of the rotary key.

A simple embodiment of the coupling between key knob and spindle consists in providing the latter with a head differing from the circular form—preferably with a hexagonal head—and arranging on the end of the push key facing the spindle a corresponding profiled recess. When the push key is pushed onto the spindle head, an interlocking connection is formed between the two parts, whereby rotary movement of the push key is transmitted to the screw-threaded spindle.

As another advantageous construction of the coupling, which becomes operative on displacement of the push key for actuating the channel selection switch, it is proposed to make the rotary key hollow and to provide on the inner wall a number of ribs having run-on slopes, and to provide on the end of the screw-threaded spindle a coupling element, preferably injection moulded of plastics material, having a number of axis-parallel tongues, corresponding to the number of ribs and resiliently deflectable in a direction towards the axis, which tongues engage the gaps between the ribs in the coupled condition. When the tongues of the coupling element fortuitously register with gaps of the ribs of the key knob, coupling of the screw-threaded spindle is effected immediately. If this is not so, the tongues of the coupling element are first bent inwardly by the run-on slopes of the ribs, so that in this angular position also, the key knob can be pressed in as far as the catch position. On rotation of the key knob, the tongues spring back as soon as the first of the different possible positions: tongue to gap, has been reached, whereby coupling of the key knob to the screw-threaded spindle is effected.

Advantageously, the return springs are mounted in the cavity of the rotary key, so that they can act on the inner end thereof. In this method of coupling, not only is rotation of the screw-threaded spindle in the resting position of the rotary key prevented, but also coupling thereof is made possible in any angular position of the screw-threaded spindle.

According to a further proposal for the mounting of the operating elements, the latter are arranged at an angle, preferably at right angles, to the plane of the resistance component, and the screw-threaded spindles of the voltage dividers are driven by means of bevel wheels. One bevel wheel of the gearing is rigidly secured to the screw-threaded spindle, while the other is preferably integral with the adjusting knob, being injection moulded from plastics material, and rotatably mounted in the frame of the unit.

Advantageously, this adjusting knob is provided with a bore hole in which the channel selecting key is slidable axially against the power of the return spring, but is nonrotatably mounted. For this purpose, the key is provided with a projection, guided in the frame of the unit, and at the same time cooperating in known manner with the locking element for arresting the key in the working position. When the key is operated, a U-spring, inserted in a recess thereof and making contact by one leg with the contact rail, is displaced so that its other leg bears with prestressing against the end of the screw-threaded spindle, and thereby establishes conductive connection between the wiper contact and the contact rail.

A particular advantage of the adjusting unit is that, for all the channel stores, the adjusted voltage value can be indicated, that is to say, the respectively stored channel can be indicated continuously, irrespective of which store is actually switched on. In the embodiment with the operating elements arranged at right angles to the resistance component, and in which the voltage dividers are therefore parallel to the front plate of the device, the particular adjustment is indicated by a projection of the wiper or wiper carrier which slides in a slot in the frame of the unit and is visible through a window in the front wall. In the construction of the unit in which the operating elements lie in the axial direction of the screw-threaded spindle, indication may be effected according to a further proposal by means of endless bands, which are carried over suitable supporting banks of the unit frame and have a hole, engaged by a projection of the wiper, which projection pushes the indication of the band corresponding to the particular wiper position in front of a window in the front wall of the apparatus.

Radio and television sets are in most cases adapted for the reception of a plurality ow wave ranges or bands for which different tuning means must be operated in each case. To simplify the operation of such a multiple range receiver, according to an embodiment of the invention, at least two groups of channel stores are provided in the adjusting unit, whereof the particular operating elements for channel selection cooperate with a respective control element for the range switch, by means whereof on actuation of the channel-selecting elements of a group, the range switch is brought simultaneously into the position necessary for said group. With this arrangement, a sufficient number of channel stores must be provided for each reception range, so that for three or more ranges, a very considerable number of stores may be necessary.

For reducing the number of channel stores in multiple range receivers, it is proposed in a further embodiment of the invention to provide for each channel store of the adjusting unit a number of voltage dividers, corresponding to the number of frequency ranges, arranged along the screw-threaded spindle and wiped consecutively by the wiper, and a device which, on the switching-in of a channel, controlled by the particular position of the wiper on one of the voltage dividers, automatically switches-in the frequency range associated with said voltage divider. With such an adjusting unit, therefore, it is possible to use each channel store for each frequency range, thereby ensuring the best possible utilisation of the unit for all transmitters to be received at one station. There is also no operating difficulty since after the one-time allocation of a channel store to a frequency range by adjustment of the wiper to the corresponding voltage divider, channel selection and channel tuning are effected in a simple manner as in the case of an adjusting unit for one frequency range, and the channel indications are also visible in the case of stores not switched-on. The greater depth of the adjusting unit, due to the increase in length of the wiper track is of no disadvantage in television sets, for which it is preferably provided, since the depth of such sets must in any event be relatively large on account of the television tube.

The voltage dividers of all channel stores associated respectively with a frequency range may be constructed in accordance with the proposals for the resistance unit. Their respective initial and end rails may be constructed separately; or if the circuit of the apparatus allows, may also be already connected on the insulator plate. Also, one or more trimmable basic resistances may be mounted on the resistance component.

An advantageous embodiment of the frequency range change-over device consists in that the switch, serving for the frequency change-over is operated by a pivotal control element, common to all channel stores and the deflection of which for the switch setting of the respective frequency range on switching in a channel is operated by a longitudinally slidable and pivotal plunger, which is actuated by the individual channel-selecting elements and which, for displacement of its point of application on the common control element, is pivoted through different angles by the wiper carriers according to their position on the voltage divider. Since the channel selecting element, on the switching-in of a channel, and hence also the plunger driven by said element, always has the same stroke, displacement of the point of application of the plunger on the control element varies its deflection, thus providing in a simple manner an association of the individual voltage dividers of each channel store with the switch strokes of the frequency range switch.

Slidability and pivoting of the plunger is achieved in a simple manner by the fact that it is provided with a pivot sliding in two longitudinal slots in the unit frame and parallel to the screw-threaded spindle. For deflection in accordance with the position of the wiper carrier, the plunger is provided with a guide strip sliding between two projections of the wiper carrier. The guide strips consists of parts, which have an inclination to the plane of the adjusting spindle such that the angle of deflection of the plunger remains unaltered during the sliding of a wiper on the resistance track, and the deflection of the plunger always occurs in the transition zone between two voltage dividers. The free end of the plunger is thereby brought into a position such that, on operation of the channel selecting element, it deflects the common control element of the frequency range switch through an angle, which effects displacement to the necessary position of the switch slide operated by the control element. On the switching-in of a second channel store, the operating element of the first channel store is released by the common locking rail and is moved back to the starting position by a return spring. The frequency range switch is brought by the plunger of the second channel store into the position corresponding to the position of its wiper.

For utilising the voltage values stored in the adjusting unit for remote channel selection, it is proposed in a further embodiment of the invention to associate with the adjusting unit a switch-over device spatially separated from it and connected in parallel with its voltage selector.

This switch-over device may be constructed in the form of a single-pole step switch having a number of step contacts corresponding to the number of channel stores. In switching over, to avoid having possibly to pass over a number of intermediate steps, the switch-over device may also be a sliding or push-key switch with mutual release of the keys, a single-pole switch being closed by each key in the working position.

In a particularly simple embodiment of such a switch-over device, the selective connection of the connecting contacts, which are conductively connected to the screw-threaded spindles of the resistances, with the contact rail of the diode supply line extending over all the push keys is established by means of a contact bridge, inserted in a recess of the key knob and bent U-shape out of spring wire on depression of the key against the force of a return spring also inserted in the recess. Associated with the push keys in known manner is a catch element, by means whereof the respectively depressed key is held in the operative position, until it is released by the depression of another key and is returned to the inoperative position by the return spring. The television channel selecting device may be combined with remote operating controls for other working values, such as sound volume, brightness and the like to form a remote operating unit.

For applications in which not only the channel selection but also the channel storage and returning are to be effected by remote control, it is proposed in a further embodiment of the invention to combine the channel selecting unit and the adjusting elements of the receiver which are accessible for permanent operation, such as volume, balance, brightness, contrast and tuning controls, in an independent assembly, adapted to be inserted in an appropriate accommodation chamber of the receiver and adapted to be connected to the latter by means of a plug-in device, or in the case of spatial separation from the receiver adapted to be connected to the receiver by means of a cable provided with suitable plug-in devices. In the principal part of the set there are then only provided the adjusting elements, such as for example picture and line synchronising controls, necessary for occasional corrections or for service purposes, while the actual operating elements are now present in the independent assembly, which may also be used as remote control part. Not only is operation simplified by the assembly of all the operating elements in part of the set ready for manipulation at the position of the viewer or listener, but the adjusting elements heretofore duplicated in remote control attachments, are dispensed with.

The independent assembly for the operating elements is advantageously provided, on the wall opposite the front, with a flush-mounted plug-in socket, which cooperates with a plug-in strip fast in the accommodation chamber, and on being plugged in automatically establishes the electrical connections of the operating part with the main part of the receiver. In this form, the receiver corresponds to the conventional construction without remote control part.

If it is desired to go over to remote control, the operating part is removed from the received and is connected to the set by means of a cable, the ends of which are provided with a suitable coupling piece and a plug. In this case, the accommodation chamber will be closed by a fitted cover. The operating part may be provided with means for setting it up or hanging it up, thus facilitating its accommodation at the operating position. If the set is to be remote controlled only, the accommodation chamber in the principal part of the set may be dispensed with, and the operating part may be constructed from the outset as assembly spatially separated from the receiver, and connected to the latter by a cable.

Where sets having a number of receiving ranges are concerned, the range change-over switch, necessarily accommodated in the principal part of the set will be operated electromagnetically from the operating part. The switches provided for this purpose in the operating part will be operated either directly or indirectly in a manner like that already proposed in the embodiments described in the foregoing for direct range switching. Electromagnetic remote control affords the advantage that the range switch may be mounted at the position in the set which appears most suitable from the point of view of HF technique.

In as advantageous further embodiment of the invention, the principal switch of the set will also be situated in the operating part, which is immediately possible in the case of battery operation. In the case of mains operated receivers, to avoid expensive safety precautions and screening, it may be more advantageous to keep the remote control cable free from mains voltage. In this case, the mains switch built into the set will also be operated electromagnetically, the necessary power being taken from a dry battery, which has only to supply a current pulse on switching on and off, so that its useful life practically corresponds to its shelf life.

In a further embodiment of the invention, provision will be made, preferably in the case of television sets, for sound reproduction at the operating part, which is particularly advantageous when, to avoid annoyance by noise to the neighbours or other persons in the same room, the loudspeaker of the principal set is switched off and the sound is to be reproduced only by a second loudspeaker arranged in the immediate vicinity of the viewer or listener and having a substantially lower acoustic power. For this purpose, the remote control cable may comprise a low-frequency line, and the operating part a connecting socket for a loudspeaker or headphones, as well as a switch, by means of which the loudspeaker or loudspeakers in the main part of the receiver may be switched off. A further embodiment comprises accommodating additionally in the operating part a small second loudspeaker, so that after insertion in the accommodation chamber, it lies in front of an opening in the housing wall, and in this working position can thus be used for giving off acoustic power.

For a better understanding of the invention and to show how it may be carried into effect, embodiments thereof will now be more fully described, by way of example, with reference to the accompanying drawings, in which:

FIG. 1 is a side view of an adjusting unit according to a first constructional example;

FIG. 2 is a plan view thereof;

FIG. 3 is a sectional view corresponding to FIG. 1;

FIG. 4 is a front elevation corresponding to FIG. 2;

FIG. 5 shows a part view of the unit with coupled-in push key;

FIGS. 6 to 10 show five constructional examples of the resistance component for the unit shown in FIGS. 1 to 5;

FIGS. 11 to 15 show a second constructional example of the adjusting unit;

Figure 14:
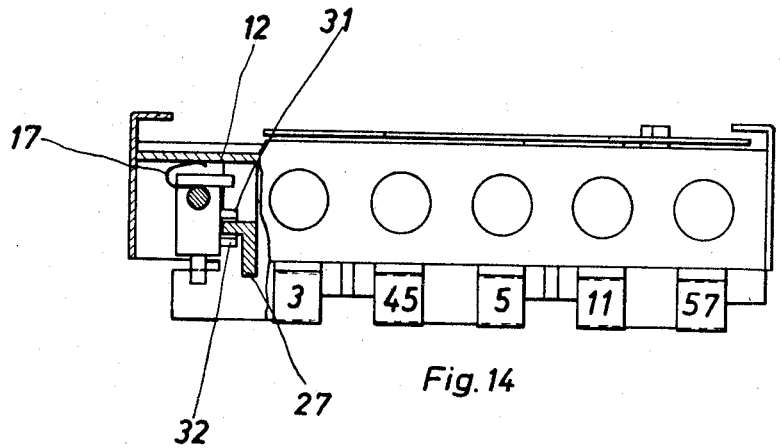

FIG. 11 being a sectional view of this adjusting unit, with a channel store switched-in;

FIG. 12 is a view similar to FIG. 11 but showing a different wiper position of the switched-in channel store;

FIG. 13 is a plan view, partly broken away, of the unit;

FIG. 14 a front view, partly broken open, corresponding to FIG. 13, and

Figure 15:
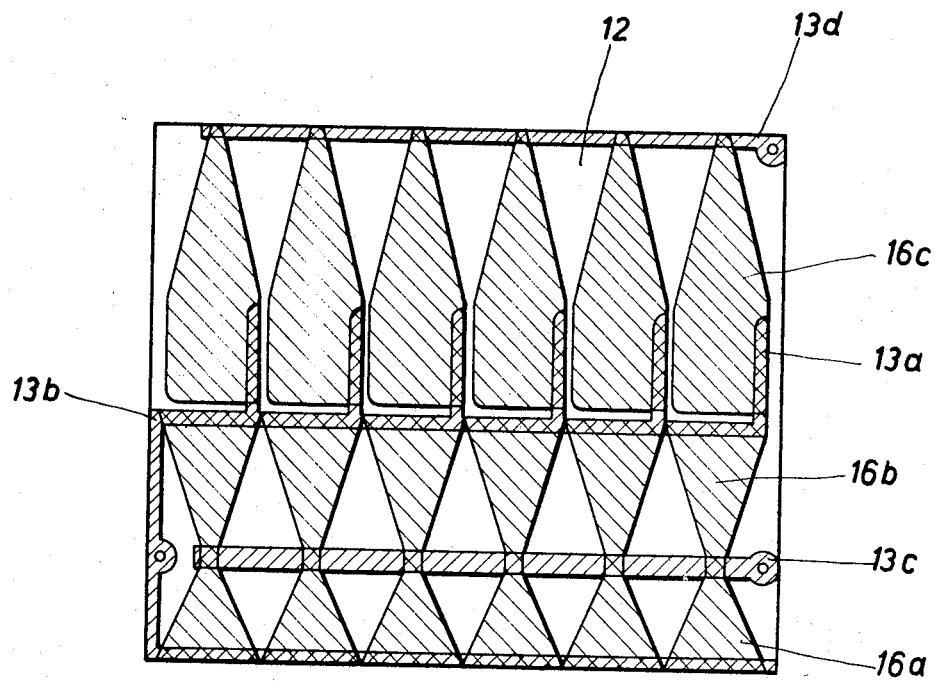
Figure 16:
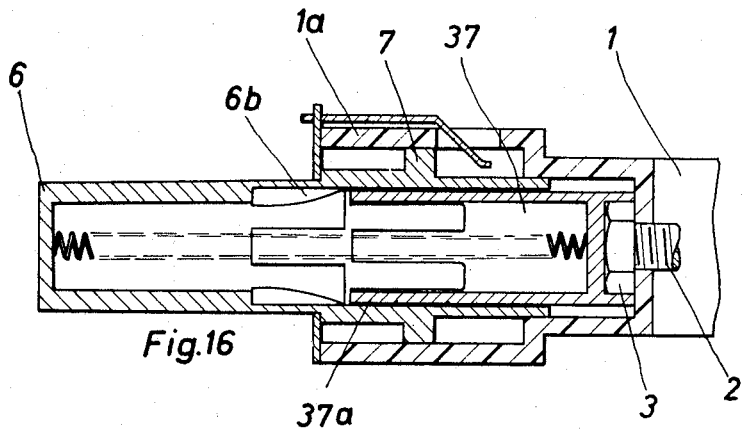
Figure 17:
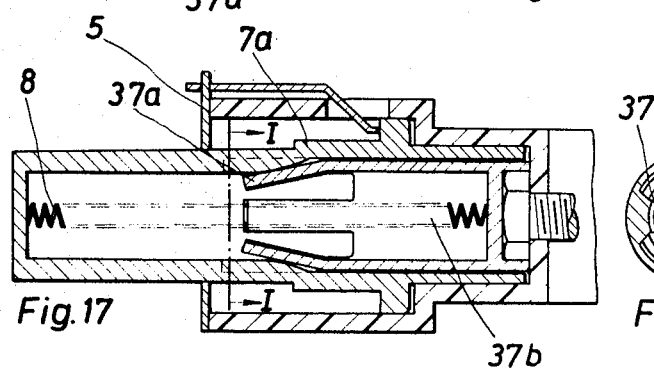
Figure 18:
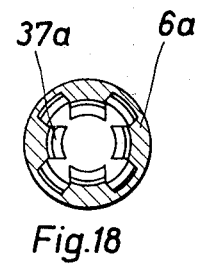
Figure 19:
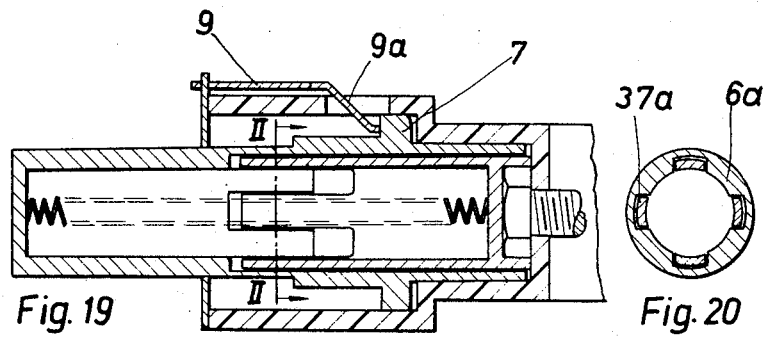
Figure 20:
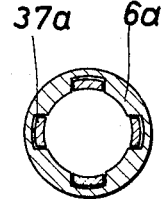
Figure 24:
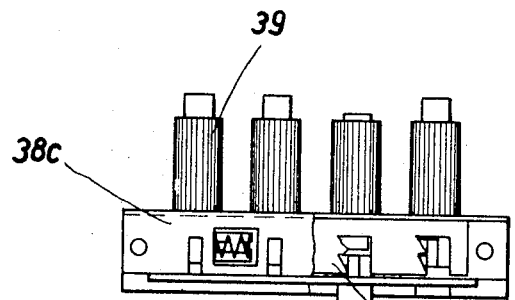
Figure 25:
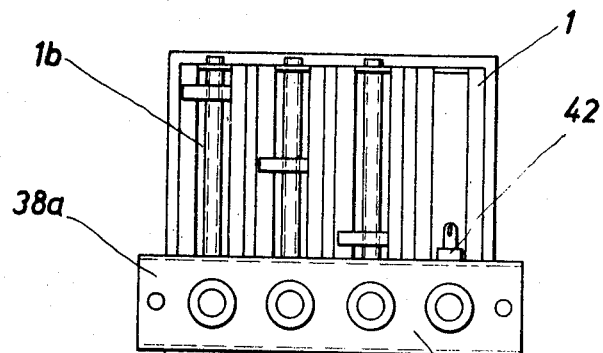

FIG. 15 a plan of a resistance component of the unit;

FIGS. 16 to 20 illustrate a constructional example of the coupling of a key knob to a screw-threaded spindle;

FIG. 16 showing part of an adjusting unit with key knob uncoupled;

FIG. 17 showing the same part with the key knob engaged but not yet coupled;

FIG. 18 showing a section on the line I—I of the coupling parts inthe position according to FIG. 17;

FIG. 19 showing part of the adjusting unit with key knob engaged and coupled, and FIG. 20 showing a section on the line II—II of the coupling parts in the position according to FIG. 19;

FIG. 21 illustrates an additional switch-over device for a switching unit of a remote control unit;

FIG. 22 shows a sectional view through a push key thereof in the working position, and FIG. 23 shows a similar sectional view in the inoperative position of the push key;

FIGS. 24 to 28 illustrate an adjusting unit with operating elements arranged at right angles to the resistance component;

FIG. 24 showing a front view, partly broken open;

FIG. 25 a plan, and

Figure 26:
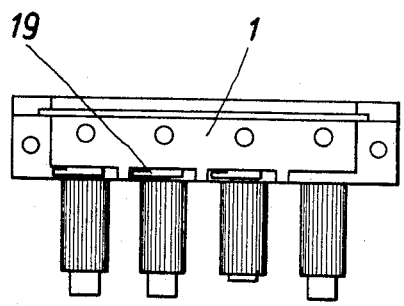

FIG. 26 a rear view of this adjusting unit;

FIG. 27 shows a section through the centre axis of a channel store in the inoperative position, and FIG. 28 shows a section partly broken away of a channel store in the operative position;

FIG. 29 and 30 are plans of two resistance components for this adjusting unit;

FIGS. 31 to 36 illustrate details of the use of the adjusting unit as a selective remote control unit for a television receiver;

FIG. 31 being a perspective view of an insertable operating unit;

FIG. 32 showing part of a television set with the accommodation chamber;

FIG. 33 showing the same part with the operating unit inserted;

FIG. 34 showing the receiver in remote control operation;

FIG. 35 being a front view of the cover for the accommodation chamber, and

FIG. 36 showing an assembly used only as remote control unit.

The first constructional example of an adjusting unit comprises an injection moulded rectangular plastics frame 1 having a partition 1' at the front side thereof. Five screw-threaded spindles 2 are rotatably but not axially slidably mounted in the frame. The spindles 2 are each provided at one end with a hexagon screw-head 3 and at the other end, after a washer has been placed thereon, each spindle is pressed flat to secure the spindle in the axial direction. Between the screw head 3 and the partion 1', a contact spring 4 is inserted with a slightly convex part, whereby an longitudinal play there may be is eliminated and at the same time, satisfactory contact is ensured between the screw head 3 and the contact spring 4.

On the front side of the frame there is furthermore mounted a guide angle 5 provided with five holes, in which are inserted five round push keys 6. These are mounted by their inner ends in corresponding holes in the frame front wall, and are supported by means of a flange 7 on the guide angle. The push keys are rotatable and can be shifted against the power of return springs 8 in a direction towards the screw-threaded spindles. The flanges 7 of the push keys are provided with conical surfaces 7', and cooperate with the common, tiltably mounted and prestressed catch element 9 in that the particular key which is despressed, after a certain movement, engages the catch element by means of the rear side of the flange, and on another key being depressed, after disengagement of the catch element 9 is returned to the inoperative position by the power of the return spring 8. The inner ends of the keys are also provided with a conical slop 6' with which a bent part 4' of the contact spring cooperates such that, after depression of the key, this spring part is pressed against the contact rail 10, being thereby resiliently deformed. A conductive connection is thereby established between the screw-threaded spindle associated with the depressed key and the contact rail 10, which connection is broken again when the key is released, through the resilient force of the spring 4. The inner end of the key is provided with a hexagonal recess 11 adapted to the screw head. When the key is pressed beyond the catch distance, an interlocking connection can be established, as shown in FIG. 5, between the screw-threaded spindle and the key, and the rotary movement of the latter is transmitted to the spindle.

Figure 8:
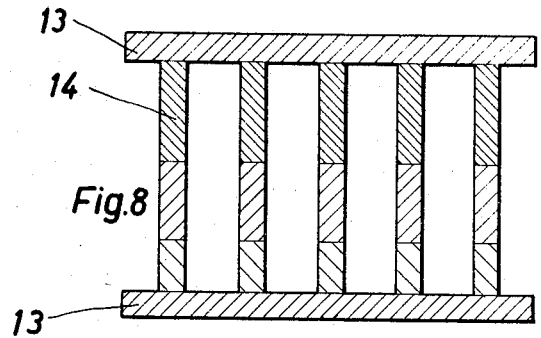

Mounted on top of the plastic frame is the resistance component 12, shown separately in FIG. 8. It is made of hard paper plate as a ladder-like structure, the side rails 13 of which are provided with a conducting silver layer or other good-conducting layer, while its rungs 14 are provided with three resistance layers having different surface resistances. The resistance plate is made by applying on a complete plate with the outer contour of the finished part, on the margins, parallel conducting silver strips and in the middle resistance layer strips. Rectangular openings are then stamped out of the plate, whereby the resistance strips 14 are formed. By suitable choice of the specific surface resistances of the three layers, it is possible to obtain voltage divider curves consisting of three parts with different slopes.

FIG. 6 shows a plan and elevation of a resistance component, whereof the rungs 13 are formed by metal rails on which are injection moulded the plastics resistance rungs 14, a definite resistance value having been imparted to the plastics material by the addition of conductive pigments. In this case also, by varying the additions of pigment, zones having different current-flow resistances can be produced.

Figure 10:
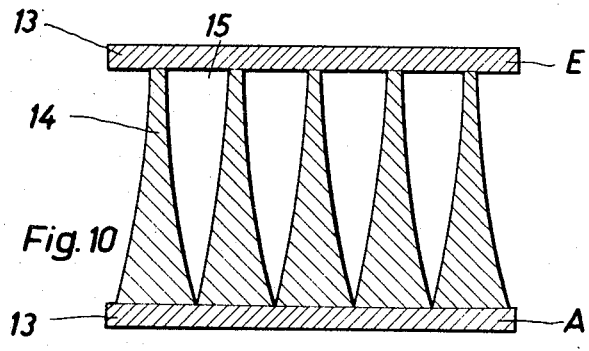

FIG. 10 shows a resistance component, which is provided with nonrectangular cut-outs for producing a nonlinear voltage curve. It is made from an insulation plate by applying to the entire surface, a surface resistance which is as uniform as possible, while conducting silver strips are applied to the upper and lower margins. Shield-like openings 15 are stamped out of this plate, so that homogeneously coated strips 14 are left between the good-conducting initial and end rails 13. The boundary lines of the strips 14 are of such a form that the strip width decreases from the rail marked A in accordance with an exponential function, resulting in an exponential form of resistance curve or voltage divider curve. After connecting to the rail A a basic resistance, the value of which is one quarter of the resistance value of the five parallel-connected strip resistances, an exponential form of the voltage divider curve is obtained in a range of 20% to 100% of the applied voltage.

Figure 9:
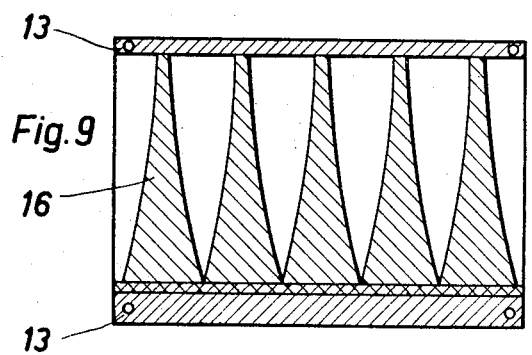
Figure 7:
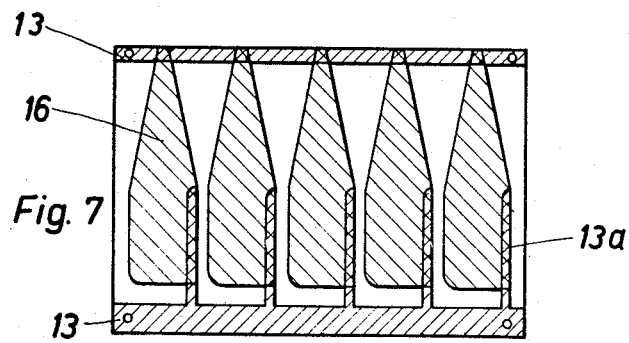

FIGS. 7 and 9 show resistance components, in which the resistance layers have been applied by means of stencils to the continuous insulator plate. In the example of FIG. 9, the width of the layer surface 16 decreases in a similar way to that in the stamped-out plate according to FIG. 10, from the commencement to the end, according to an exponential law, so that in this case also an exponential voltage divider curve is obtained.

FIG. 7 shows a resistance component, in which surface voltage dividers are used for producing non-linear curves. Applied to the plate, provided with initial and end rails 13, are five homogeneous resistance surfaces 16, which overlap the upper end rail, but do not contact the initial rail at their lower ends. Connection is effected by means of contact strips 13a, extending approximately over half the right-hand lateral boundary of the resistance surface, parallel to the dot-and-dash wiper track, and connected to the common initial rail 13. Due to this construction of the contact electrodes and the tapering of the resistance surface towards the upper end, when voltage is applied to the initial and end rails, a potential distribution is obtained, in which the density of the equipotential lines along the dot-and-dash wiper track increases continuously from below upwards. If the surfaces are explored on this track, and a suitable basic resistance is connected in series, a voltage divider curve is obtained which has an exponential form with good approximation.

Adjustment and pick-up of the voltage is by means of the wiper contacts 17, which move along the screw-threaded spindles 2. The wiper 17, bent substantially U-shape from spring sheet, lies with its tongue-like bent end on the resistance strip, while the likewise bent end of the other branch or leg slides with a broad face on a guide rail 18, rotation of the wiper during movement being thereby prevented. The two legs are provided with holes, the diameter of which is adapted to the core diameter of the screw-threaded spindle and the edges of which are embossed in the form of a screw-thread. On being screwed on the spindle, the two legs are tensioned with respect to each other, so that the wiper contact runs on the spindle free from play.

On the crosspiece, the wiper contacts have two extensions 19, which engage endless plastics bands 20 sliding on supporting banks 21 and 22 of the plastics frame or of the guide angle. These bands have numbers printed on them, so that on adjustment of the wiper contacts, the particular number appears in a window of a front plate (not shown but mounted in front of the end of the adjusting unit) and is permanently visible.

The adjusting unit shown is used for tuning HF circuits by varactors in the following manner. A D.C. voltage, as constant as possible, is applied to the initial and end rails 13 of the resistance component, while the varactors, possibly by way of additional switching means, are connected to one of the rails 13 and the contact rail 10. For storing the channels, the keys 6 are pressed in succession as far as the overstroke and by rotation of the respective channel stores are adjusted to the desired frequency, the corresponding channel characteristic becoming visible at the same time in the window of the front plate. Since the resolving power of the layer resistances is very high, and due to the screw-threaded spindles, a very high transmission ratio of the movement is obtained, the voltage dividers can be adjusted to a very fine degree, whereby exact tuning of the channel store is facilitated.

For channel selection, it is merely necessary to press the push key of the channel store, in the indicating window of which the desired channel number is visible, whereby the particular voltage necessary is applied to the varactors. Since no mechanical movement of the wiper occurs the adjusted voltage also persists on repeated channel changing. Any slight alterations of the total resistance of the individual resistance strips also are without any effect at all, due to the voltage divider circuit, on the adjusted partial voltage, or exert an effect only to a very slight extent. Alteration of the channel storing or any necessary fine tuning thereof can be carried out at any time by rotation of the corresponding keys in overstroke.

The adjusting unit shown is provided for receivers with two bands (wave ranges), the three upper channel stores being associated with the first band, and the two lower channel stores with the second band (FIG. 2). The tuning means necessary for the particular band, such as coils or even complete amplifier stages including valves or transistors, are switched in automatically by the switches 23 and 24 on pressing one of the channel selecting keys of the corresponding band. For this purpose, control levers 25 and 26 are pivoted on the partition 1', one arm of which levers cooperates with the conical surface 6' of the push keys, while the other arm is in engagement with the slide of the band switch 23 or 24. On depression of a key, therefore, the corresponding band switch is operated at the same time, and remains switched on when a key of the same band is depressed, while when a key of the other band is depressed, it is released, and the switch of said other band is switched on at the same time.

In this first constructional example, each channel store can be used only for a single frequency band. In the following constructional example, an adjusting unit is described, in which in each channel store, the channels of three bands can be stored selectively. (In both embodiments, corresponding parts are provided with the same reference numerals.)

This adjusting unit (FIGS. 11 to 15) has a rectangular plastics frame 1, in the front and rear wall of which six screw-threaded spindles 2, provided with hexagonal heads 3, are rotatable but not axially slidable. Coaxially with them are journalled in guide bushes of the frame the round rotatable key knob 6, slidable against the power of the return spring 8, and in the inoperative position are supported by a collar against the front wall 5 fixed to the frame. Each key knob is provided with a flange 7, by means of which, after the channel store has been switched on, it catches behind the common locking rail 9 pivoted to the front wall, said rail being lifted out when another channel is switched on, so that the first key knob returns to the inoperative position.

In the arrested position, the inner end of the key 6 at the same time presses the spring 10a of the contact rail 10 against the contact angle 4 conductively connected to the hexagonal head of the screw-threaded spindle 2, whereby the wiper 17 is connected to the connecting rail 10. The wiper 17 is inserted in the screw-threaded wiper carrier 17a such that it bears under spring tension on the screw-threaded spindle 2 and on the resistance plate 12. The key knob 6, when moved beyond the arrested position, can be coupled to the screw-threaded spindle by means of a recess 11 in its end adapted to the hexagon head, so that in this position the wiper is adjustable by rotation of the key knob.

The resistance plate 12 (FIG. 15) has three groups, each of six layer resistance surfaces 16a, 16b, 16c applied to a rectangular insulator plate, the width of the layer surfaces shown shaded decreasing or increasing along the dash-and-dot wiper track for obtaining a non-linear voltage curve. The initial and end portions of each group are connected together by conducting silver rails, the rail 13b forming the common initial rail for all the groups, the rail 13c the common end rail of the resistances 16a and 16b, and the rail 13d, the end rail of the resistances 16c. The resistance layers 16c are formed as surface voltage dividers, with which a suitable form of voltage curve is produced by the contact rails 13a parallel to the wiper track. The resistance group 16a is allocated to band I, group 16b to band III and group 16c to the UHF band.

For automatic band change-over in accordance with the particular position of the wiper 17 on one of the resistances 16a, 16b, 16c, use is made of the plunger or push rod 27, which is guided by the pivot 28 in slots 29 of the plastics frame 1 and by the ledge 30 of the plunger 27 between the projections 31 and 32 of the wiper carrier 17a. Pivoted to the back wall of the frame by pivot 33 is the flap 34 as common control element for the switch slide 35 of the frequency range switch, not shown. When switching-in a channel, the plunger 27 is shifted by the flange 7 of the key knob into the position shown, in which its right-hand end deflects the flap 34, which in its turn pushes the slide 35 against the power of spring 36.

FIG. 11 shows a switched-in channel store, in which the wiper 17 is on the resistance 16a. The plunger 27 is in this case rocked by the projections 31, 32, so that its end engages close to the pivot of the flap 34 and rotates the latter through a relatively large angle, whereby the switch slide 35 is brought into the position shown, in which it establishes the necessary connections for band I. The contacts of the band change-over switch, not shown, are so dimensioned that these connections still exist when the key head is pressed into the overstroke position for channel tuning.

FIG. 12 shows a switched-in channel store, in which the wiper 17 is on the resistance 16c. In this wiper position, the plunger 27 is rocked downwardly on the right-hand side by the projections 31, 32, so that the flap is given a smaller deflection, and the switch slide 35 is moved by the spring 36 to the left into the position provided for the UHF band.

In the same way, the band switch may also be brought into the switch position, not shown, for band III, when the wiper is on the middle resistance 16b.

For channel indication, the endless band 20 having suitable indications is provided, said band being slidable on suitable extensions of the frame 1, and being brought into such a position by the stud 19 of the wiper carrier 17a that the adjusted channel is indicated at the front below the key knob.

In both constructional examples, for channel storing or returning, the key knobs 6 must be pressed simultaneously during rotation, since otherwise the return spring 8 will release the coupling between key head and screw-threaded spindle. FIGS. 16 to 20 show a constructional example of a coupling, which is operative on arrestment of the key knob in the working position and is maintained in this position until the key knob is brought into the inoperative position.

The screw-threaded spindle 2, provided with the hexagon head 3 and serving for the adjustment of the voltage divider (not shown) is rotatably mounted in the partly shown plastics frame 1. Fast on the hexagon head is the substantially cylindrical coupling element 37, injection moulded of plastics material with a suitable recess. Injection moulded on the coupling element are four flat tongues 37a, which are uniformly distributed on the periphery and can be bent towards the spindle axis by resilient deformation.

The key knob 6, formed as a hollow cylinder, closed at the end and provided with the collar 7 is axially slidable in the pot-shaped part 7a, injection moulded on the frame. In the inoperative position, the knob is pressed to the left by the helical pressure spring 8 inserted in the bore 37b of the coupling element until the key knob bears with the annular shoulder 7a against the end wall 5 fast on the frame. The inner wall of the key knob, the bore of which is adapted to the external diameter of the coupling element while maintaining a certain clearance, has on the forward half remote from the screw-threaded spindle four ribs, 6a, the profile of which fits into the gaps between the tongues 37a of the coupling element, and which merge by the run-on slopes 6b with the inner wall. If the key knob in the inoperative position (according to FIG. 16) is pressed, the locking rail 9, pivotally mounted in the end wall 5 and engaging with the lug 9a in the pot 1a, will be lifted out against the action of a spring (not shown) and the lug 9a catches in the pressed position behind the collar 7. The tongues 37a, provided they do not stand just at gaps between the ribs, will be bent inwardly by the run-on slopes 6b (FIG. 17) and remain in this position as long as the key knob is not rotated.

If for retuning or fine tuning, the key knob is rotated to the right or left, the bent tongues slide on the ribs until, after a rotation of at the most 45°, a position is reached in which they stand exactly opposite gaps between the ribs, and after returning to their axial-parallel position, now transmit the rotary movement of the knob to the screw-threaded spindle (FIGS. 19 and 20).

By pressing another key, the locking rail 9 is lifted out, and the key knob returns under the action of the return spring 8 to the inoperative position according to FIG. 16. The coupling between spindle and key knob is thereby released, so that rotation of the knob in this position causes no alteration to the tuning.

The third constructional example shows an adjusting unit, which is preferably suitable for use for *one* frequency range, advantageously the ultrashort wave broadcasting range, and for sets of small dimensions, such as portable sets (FIGS. 24–31).

Rotatably fast on the crosspiece 38a of the U-shaped carrier rail 38 are the hollow rotary knobs 39, which are provided on their inner end with a bevel gear crown 39a. The latter engage the bevel gear wheels 40, formed in the same way, which are rotatably mounted on the inner wall 38b of the carrier rail. Fast with the bevel gear wheels 40 are the screw-threaded spindles 2, on which the wiper carriers 17a, provided with internal screw-threads, are axially movable by rotation of the spindles.

The rotary knobs 39 and the bevel gear wheels 40, according to another proposal, are injection moulded on the carrier rail which has not yet been bent, the screw-threaded spindles 2 being injection moulded at the same time in the bevel gear wheels. Due to shrinkage of the plastics material, the rotary knobs and bevel gear wheels have a certain rotatability, accompanied by a frictional moment dependent on the choice of plastics material and the shaping, and are then brought into engagement with each other by bending of the lateral wall 38b.

The screw-threaded spindles are journalled at the other end in the plastics frame 1, which in its turn is secured to the carrier rail 38. The resistance component 12 is inserted at the open side of the frame and is placed on studs of the carrier rail, which are joggled for securing the component.

Two embodiments of the resistance component 12 are shown by way of example in FIGS. 29 and 30. The resistance component according to FIG. 29 consists of an insulator plate, on which three homogeneous resistance layer surfaces 16 have been applied, the width of said surfaces diminishing according to an exponential function along the wiper track for obtaining an exponential voltage divider curve. Their initial and end portions are connected together by the conducting silver strips 13b and 13c. Parallel to the short leg of the L-shaped silver strip 13b is the conducting silver layer 13d, and applied over both is the rectangular resistance surface 16d, which has the same surface resistance as the layers 16, and serves as basic resistance. Due to the fact that the connections are made to the long sides of the layer surface 16d, it is possible to obtain a comparatively small resistance value of the basic resistance with the relatively high surface resistance of the layer surfaces 16. By shaving off part of the layer surface 16d, the value of the basic resistance can be trimmed exactly for producing a predetermined range of regulation of the voltage dividers.

FIG. 30 shows a resistance component, in which homogeneous trapezoidal resistance layers 16 are applied to the insulator plate between the conducting silver strips 13b and 13c, conducting silver strips 13a, connected to the conducting silver strips 13b, being applied to the short parallel sides of said resistance layers. This formation of the resistance surface and contact electrodes provides an approximately exponential form of voltage divider curves, in which the range of regulation is larger than in the example of FIG. 29. Since in addition a smaller basic resistance is also required, the short leg of the L-shaped strip 13*b* is forked, so that it embraces the strip 13*d* with a narrow gap, whereby the effective length to width ratio of the resistance layer 16 of the basic resistance is increased. In this case also, exact trimming can be carried out by partial shaving of the effective resistance surface.

The insulation plates of these resistance components in addition comprise openings for fixing and guiding the key knob and contact rail, respectively.

The wiper springs 17, formed of spring wire, are inserted in the wiper carriers 17*a* in such a manner that they make contact with the screw-threaded spindles 2, and their free ends, on rotation of the spindles, slide with suitable contact pressure along the dot-and-dash track of the resistance layers 16.

Projections 19 are moulded on the wiper carriers, and project into the slots 1*b* of the frame and indicate the position of the wiper at the time.

In the hollow knobs 39, the likewise hollow key knobs 6 are axially slidable and in them are inserted the helical return springs 8. The helical springs bear against the contact rail 10 formed of wire, inserted in the transverse slots 6*c* of the key and bearing against the webs 12*a* of the resistance plate.

Moulded on the keys are projections 6*d*, provided with run-on slopes and cooperating with the catch slide 9, longitudinally slidable on the front lateral wall 38*c* and put under tension by a helical spring, in such a manner that after being pressed, the key is arrested in the working position and when another key is pressed, is released and is returned to the inoperative position by the spring 8.

The contact spring 41 made of spring wire is inserted in the cavity and in the slot 6*e* of the key in such a manner that it catches by the part 41*a* behind the helical spring and bears with prestressing by the long leg 41*b* against the contact rail 10. When the key is pressed, the contact nose 41*c* of the contact spring is pushed onto the end face of the screw-threaded spindle 2 (FIG. 28), whereby the wiper spring 17 of the associated resistance 16 is connected to the contact rail 10.

Three channels can be stored with this adjusting unit. For this purpose, the first key is pressed and the corresponding knob is rotated until the wiper supplies the voltage, necessary for the frequency of the desired channel, to the contact rail 10, which is connected to the varactor.

After this first-time adjustment, this channel remains stored and can be switched in again at any time by pressing the first key. In the same way, the second and third channel store can be occupied by the desired channel. In the present example, the fourth key is for switching over to continuous tuning. The screw-threaded spindle is therefore replaced by the contact 42, which when the fourth key is pressed, connects the contact rail 10 with the wiper of a tuning resistance, not shown, outside the adjusting unit.

The fourth key could also be used for channel storage if changing over from stored to continuous tuning were effected in a separate switch, for example with a corresponding push key of the range change-over.

A change-over device used in parallel with this adjusting unit as remote control unit in combination with other remote controls is described in the following constructional example. It corresponds substantially to the channel selecting device of this adjusting unit, so that corresponding parts are provided with the same reference numerals.

The quadruple change-over device and controls 44–45 for volume and tone are accommodated in the two-part oblong housing 43 (FIG. 21). The hollow cylindrical key knobs 6 slide in guides 43*a* of the left-hand housing half and in holes 46*a* in the hard paper plate 46, which is inserted between the two housing halves. Inserted in the hollow key knob is the return spring 8, which is constructed as helical pressure spring and is supported on the embossed contact rail 10, which in its turn rests on the hard paper plate 46. Mounted in the cavity and slot 6*e* is the contact bridge 41 bent from spring wire and, in the inoperative position, bearing by the legs 41*a* and 41*b* with slight prestressing against the inner wall of the key. The leg 41*a* is cranked and lies with the angled part behind the end turn of the return spring 8, whereby the contact bridge is fixed axially in relation to the key knob. In addition, the key knob is provided with transverse slot 6*e*, by means of which it slides in axial displacement on the contact rail 10. Mounted on the hard paper plate 46 are four connection contacts 47 parallel to the key knobs, three of which contacts are connected by the cable 48 to the screw-threaded spindles of the voltage dividers of the adjusting unit, and the fourth is connected to the wiper of the continuous tuning control in the set. The contact rail 10 is connected in the same way to the contact rail of the adjusting unit and thereby to the tuning diode. In the inoperative position of the key shown in FIG. 23, the contact bridge 41 is connected only to the contact rail 10, while the connecting contact 47 has no connection.

If the key knob is pressed to the right in the direction of the arrow, the inclined part of the crank of the leg 41*a* runs onto the slightly angled end of the connecting contact 47, whereby this leg is pressed downward, and the contact bridge now bears with suitable pressure both on the contact rail 10 and on the connecting contact 47. Mounted on the underside of the key knobs are the catch noses 6*d*, which cooperate with the locking slide 9, which is under spring pressure, in such a manner that the key knob pressed at the time is held in the working position (FIG. 22). When another key is pressed, the catch slide is shifted at right angles to the plane of the drawing against the action of a spring, not shown, whereby the previously pressed key is released and is brought by the return spring 8 into the inoperative position, while the other key is arrested.

By means of this change-over device, it is possible for three channels stored in the adjusting unit of the set to be switched on selectively by means of the remote control, it being merely necessary to ensure that all the push keys of the adjusting unit in the set are in the inoperative position. By means of the fourth knob, the continuous tuning control of the set can be operated.

FIGS. 31 to 36 illustrate the application of adjusting units according to the invention as remote control unit for television receivers in two examples.

The operating unit according to the first constructional example consists according to FIG. 31 of the parallelepiped at plastics housing 49, on the front side 49*a* of which are mounted the individual adjusting elements. In the top half is an adjusting unit corresponding to the second constructional example with six key knobs 6 and the channel indicating windows 50. Switching in of the desired channel is effected by pressing the key, in the window of which the number of this channel is indicated. In the pressed condition of the key, rotation of the latter enables the channel store to be fine-tuned or if necessary another channel to be adjusted to it.

Below the tuning unit are the controls for brightness, contrast and volume with the operating knobs 51, 52, 53. On the right-hand side wall is a small loudspeaker mounted behind the sound aperture 54. The push key 55 is for switching off the loudspeaker incorporated in the main part of the set.

By means of the tip key 56, the exciter winding of an electromagnetic current pulse relay, in the main part of the set, can be connected for a short time to an auxiliary battery, and the set can thereby be switched on or off. In an opening of the non-visible rear wall of the operating unit a contact strip is flush mounted which, when the operating unit is inserted in the accommodation chamber 57 of the television set 58, establishes by means of the plug strip 59 (FIG. 32) the electrical connections of the operating unit with the main part of the receiver. In the right-hand lateral wall of the receiver is the sound window 60, through which the sound of the loudspeaker in the operating unit is now irradiated. In this working condition, the receiver corresponds to a conventional television set with asymmetrical arrangement of the operating knobs.

FIG. 34 shows the receiver in the remote control condition. The operating unit has now been taken out of the accommodation chamber, and connected to the receiver by means of the multiple cable 61, which is introduced into the set through the bottom opening 62 (FIG. 32) and is connected to the plug strip 59. To provide a convenient position, the operating unit is set up at an angle by means of the frame 63. The latter may also be used for example for suspending the operating unit for example from a table edge or a chair arm. The opening of the accommodation chamber 57 in this mode of operation is closed by the shutter 64, the surface of which is adapted to the front wall. All the operational functions, including starting up of the set, may now be carried out at the position of the viewer, and if required, the loudspeaker of the main part may be switched off by means of the switch 55.

FIG. 36 shows a component, which is provided solely as remote control unit, and is therefore permanently connected by the cable 65 to the main part of the television receiver not shown. Built into the deck-like housing 66 is an adjusting unit with eight store units, in which by pressing a knob 6 channel selection is effected and, by rotation of the corresponding coaxial knob 39 which is connected by bevel gear to the screw-threaded spindle of the voltage divider, channel tuning is effected. The channel adjusted at any time is indicated on the scale 67 by the pointer 19. The channel store groups on the right and left-hand side are each associated with a television band, changing over of which is effected in the main set by electromagnetic switches, which are energised from the operating part on pressing a key button of the corresponding group.

The knobs 51, 52, 53 are again allocated to the brightness, contrast and volume controls, while key 56 is for the electromagnetic switching on of the set, and the key 55 for switching off the loudspeaker in the main set. A second loudspeaker or earphones may be connected to the sockets 68.

What is claimed is:
1. Push-button channel selecting and voltage divider presetting device comprising:
   (a) a supporting plate;
   (b) a plurality of elongated resistors electrically insulatedly placed on said plate;
   (c) electrical conductors likewise electrically insulatedly placed on said plate and electrically conductingly connected with the ends of said resistors, said conductors being adapted to be connected to a source of electric current;
   (d) a frame structure having said supporting plate secured to it;
   (e) push buttons slideably mounted for back and forth movement in said frame structure;
   (f) first spring means individually inserted between said frame structure and each one of said push buttons for biasing said push buttons in an outward direction;
   (g) second spring biased means on said supporting frame structure adapted to commonly engage one of said push buttons at a time for holding it against the action of said first spring means in the inwardly pushed position while releasing all other push buttons;
   (h) a plurality of scref-threaded spindles, one each for each of said resistors and extending close to and parallel with such resistor;
   (i) a wiper contact on each one of said screw-threaded spindles resiliently engaging the appertaining one of said resistors;
   (j) switching means inserted between each one of said wiper contacts and a common conductor adapted to be connected to a voltage responsive reactance device;
   (k) means on said push buttons adapted to switch on the switching means of the appertaining wiper contact to the said conductor upon pushing in such push button; and
   (l) means associated with each of said push buttons adapted to rotate said spindles, to thereby move the appertaining one of said wiper contacts along the appertaining one of said resistors and to thereby preset such resistor to a desired voltage division.

2. Push-button device as defined in claim 1, in which said spindles are electrically connected to the appertaining one of said wiper contacts and said switching means.

3. Push-button device as defined in claim 1, in which said push buttons are supported rotatably about their respective longitudinal axis and adapted upon rotation to rotate the appertaining one of said spindles.

4. Push-button device as defined in claim 3, in which clutch means are provided between each of said push buttons and the appertaining one of said spindles.

5. Push-button device as defined in claim 4, in which said clutch means are adapted to drivingly connect said push button and said spindle upon pushing said push button into engagement with said second spring biased means.

6. Push-button device as defined in claim 4, in which said clutch means are adapted to drivingly connect said push button and said spindle upon pushing said push button inwardly beyond its position of engagement with said second spring biased means.

7. Push-button device as defined in claim 1, in which said means adapted to rotate said spindles comprise a knob arranged coaxially with the respective one of said push buttons and means drivingly connecting said knobs and said spindles.

8. Push-button device as defined in claim 7, in which said spindles are arranged at an angle to said push buttons and knobs and in which said means drivingly connecting said knobs and said spindles comprise bevelled gears.

9. Push-button device as defined in claim 1, in which said resistors and said conductors are applied to an insulating base plate, having stamped out openings surrounded by said resistors and conductors.

10. Push-button device as defined in claim 1, in which a ladder-shape stamped out supporting plate of insulating material comprises side rails and transverse members connecting the side rails, and in which said side rails have applied thereto layers constituting said electrical conductors and said transverse members have applied thereto layers of resistor material constituting said resistors.

11. Push-button device as defined in claim 1, in which said resistors comprise adjoining layers of different resistivity so as to obtain a nonlinear resistance curve.

12. Push-button device as defined in claim 1, in which said resistors are formed of metal films.

13. Push-button device as defined in claim 1, in which said resistors are formed by plastic lacquer layers provided with conductive pigment.

14. Push-button device as defined in claim 1, in which said resistors are formed of metaloxide films.

15. Push-button device as defined in claim 2, in which for each push button a U-shaped spring inserted in a recess of said push button engages said screw spindle and said common conductor upon pushing in of the respective push button.

16. Push-button device as defined in claim 4, in which said clutch means comprise for each push button a matchingly formed unround recess and head on the inner end of said push button and the adjacent end of said spindle, respectively, the head being received in said recess in the pushed-in position of said push button and establishing coupling of said button to said spindle.

17. Push-button device as defined in claim 4, in which said push button is hollow and has its interior surface provided with circumferentially spaced ribs extending in the axial direction of said button, said ribs being provided with inclined end surfaces, in which said spindle is connected to a coupling member having resilient tongues extending toward said button and adapted to fit between adjacent ones of said ribs upon said button having been pushed inwardly and having been turned so that said tongues and the spaces between said ribs register, said inclined end surfaces of said ribs being adapted to permit said tongues to run into said ribs when said tongues and the spaces between said ribs do initially not register upon initially pushing the button in.

18. Push-button device as defined in claim 1, in which a part associated with said wiper contact constitutes a visible indicator for the position of said wiper contact.

19. Push-button device as defined in claim 1, in which an endless tape connected with said wiper contact is guided around fixed points of said frame structure and is provided with indices, said indices being visible through a window in a wall of said frame structure.

20. Push-button device as defined in claim 1, adapted for use in receivers including a plurality of wave ranges having means associated to groups of said push buttons appertaining to said wave ranges and actuating the means switching on the desired wave range upon pushing in of one push button of the appertaining wave range.

References Cited

UNITED STATES PATENTS

| | | | |
|---|---|---|---|
| 2,972,123 | 2/1961 | Blom | 338—181 |
| 3,029,339 | 4/1962 | Wen Yuan Pan | 325—468 |
| 3,162,802 | 12/1964 | Dietrich | 334—15 XR |
| 3,284,697 | 11/1966 | May | 338—180 XR |
| 3,307,133 | 2/1967 | Wolff | 338—131 XR |
| 3,354,397 | 11/1967 | Wittig | 325—459 |

ROBERT L. GRIFFIN, Examiner

R. MURRAY, Assistant Examiner

U.S. Cl. X.R.

325—465; 338—128, 131, 180, 181